(12) United States Patent
Arora

(10) Patent No.: US 11,131,486 B2
(45) Date of Patent: Sep. 28, 2021

(54) INTEGRATED CHILLING OF PROCESS AIR COMPRESSION IN AMMONIA PLANTS UTILIZING DIRECT AND INDIRECT CHILLING FROM THE AMMONIA COMPRESSION TRAIN OF THE PLANT FOLLOWED BY AIR FLOW SPLIT AND MULTISTAGE AIR PREHEATING TO THE SECONDARY AMMONIA REFORMER

(71) Applicant: Vinod Kumar Arora, Katy, TX (US)

(72) Inventor: Vinod Kumar Arora, Katy, TX (US)

( * ) Notice: Subject to any disclaimer, the term of this patent is extended or adjusted under 35 U.S.C. 154(b) by 183 days.

(21) Appl. No.: 16/380,127

(22) Filed: Apr. 10, 2019

(65) Prior Publication Data

US 2019/0264959 A1 Aug. 29, 2019

Related U.S. Application Data

(63) Continuation-in-part of application No. 15/683,026, filed on Aug. 22, 2017, now Pat. No. 10,302,338, which is a continuation of application No. 14/241,018, filed as application No. PCT/US2013/054951 on Aug. 14, 2013, now Pat. No. 9,772,129.

(60) Provisional application No. 61/706,305, filed on Sep. 27, 2012, provisional application No. 61/684,684, filed on Aug. 17, 2012.

(51) Int. Cl.
*F25B 29/00* (2006.01)
*C01C 1/04* (2006.01)
*F25B 7/00* (2006.01)

(52) U.S. Cl.
CPC .......... *F25B 29/003* (2013.01); *C01C 1/0405* (2013.01); *F25B 7/00* (2013.01); *B01J 2219/00006* (2013.01); *Y02P 20/129* (2015.11); *Y02P 20/52* (2015.11)

(58) Field of Classification Search
CPC ........ F25B 29/003; F25B 7/00; Y02P 20/129; Y02P 20/52; Y02P 20/50; C01C 1/003; B01J 2219/00006
See application file for complete search history.

(56) References Cited

U.S. PATENT DOCUMENTS

| | | | | |
|---|---|---|---|---|
| 3,442,613 A | * | 5/1969 | Grotz, Jr. | F25J 3/0276 423/354 |
| 3,715,887 A | * | 2/1973 | Weatherly | F02C 6/10 60/650 |
| 4,022,030 A | | 5/1977 | Brugerolle | |
| 4,414,191 A | * | 11/1983 | Fuderer | F25J 3/046 423/359 |
| 4,464,228 A | | 8/1984 | Roensch | |

(Continued)

FOREIGN PATENT DOCUMENTS

| EP | 115752 B1 | 12/1986 |
|---|---|---|
| EP | 0585934 A1 | 3/1994 |

(Continued)

*Primary Examiner* — Kun Kai Ma
(74) *Attorney, Agent, or Firm* — Michael A. Ervin; M. A. Ervin & Associates

(57) ABSTRACT

An improved performance ammonia plant system utilizing both a direct and indirect chilling of the compressed process air train using a single or multistage chilling system integrated with the ammonia plant ammonia compression train to increase process air flow to the secondary ammonia reformer of the ammonia plant.

16 Claims, 10 Drawing Sheets

(56) References Cited

U.S. PATENT DOCUMENTS

| | | | | |
|---|---|---|---|---|
| 4,479,925 A | * | 10/1984 | Shires | C01B 3/025 |
| | | | | 423/359 |
| 4,792,441 A | * | 12/1988 | Wang | C01B 3/025 |
| | | | | 252/373 |
| 4,869,888 A | * | 9/1989 | O'Neill | C01C 1/047 |
| | | | | 423/359 |
| 5,694,772 A | * | 12/1997 | Weinberg | F03G 7/04 |
| | | | | 60/641.2 |
| 5,842,345 A | | 12/1998 | Scharpf | |
| 5,935,544 A | | 8/1999 | Bhakta | |
| 6,170,263 B1 | | 1/2001 | Chow | |
| 6,191,174 B1 | * | 2/2001 | Early | C07C 29/1518 |
| | | | | 518/705 |
| 7,821,158 B2 | | 10/2010 | Vandor | |
| 7,967,896 B2 | | 6/2011 | Lechnick | |
| 8,020,404 B2 | | 9/2011 | Vandor | |
| 2004/0216465 A1 | * | 11/2004 | Sheppard | C10G 2/32 |
| | | | | 60/781 |
| 2008/0170980 A1 | | 7/2008 | Reddy | |
| 2009/0049836 A1 | | 2/2009 | Erickson | |
| 2009/0113928 A1 | * | 5/2009 | Vandor | F25J 1/0202 |
| | | | | 62/612 |
| 2011/0000256 A1 | | 1/2011 | Vandor | |
| 2012/0047870 A1 | * | 3/2012 | Kasuga | F02C 7/22 |
| | | | | 60/39.462 |
| 2012/0128463 A1 | | 5/2012 | Held | |
| 2014/0305160 A1 | * | 10/2014 | Chong | F25J 1/0292 |
| | | | | 62/613 |

FOREIGN PATENT DOCUMENTS

| | | |
|---|---|---|
| EP | 0585934 B1 | 4/1998 |
| EP | 0770578 A3 | 10/1998 |
| EP | 914294 B1 | 10/2001 |
| EP | 0703420 B1 | 11/2001 |
| WO | WO/2002/042209 A1 | 5/2002 |

\* cited by examiner

INTEGRATED CHILLING OF PROCESS AIR COMPRESSION IN AMMONIA PLANTS UTILIZING DIRECT AND INDIRECT CHILLING FROM THE AMMONIA COMPRESSION TRAIN OF THE PLANT FOLLOWED BY AIR FLOW SPLIT AND MULTISTAGE AIR PREHEATING TO THE SECONDARY AMMONIA REFORMER

CROSS-REFERENCE TO RELATED APPLICATIONS

This application is a Continuation-in-Part of U.S. Ser. No. 15/683,026, filed on Aug. 22, 2017, which is a continuation of U.S. Ser. No. 14/241,018 filed Feb. 25, 2014 based on PCT/US2013/054951 filed Aug. 14, 2013 and claims the benefit of U.S. application Ser. No. 61/706,305, filed Sep. 27, 2012. The aforementioned patent applications are hereby incorporated by reference in its entirety into the present application to the extent consistent with the present application.

FIELD

This disclosure relates to multistage chilling of a process air compressor by integrating refrigerant ammonia stream at different temperature levels from an existing or new ammonia compression train to provide air chilling leading to a significant increase in process air compression capacity and a much higher energy efficiency, with relatively low capital. In addition it relates to the downstream splitting and preheating of the resultant higher air production flow rates feeding the secondary reformer in an ammonia plant.

BACKGROUND

The process air compressor in most operating ammonia plants is normally the first major bottleneck to increase the ammonia production. The process air compressor for typical average size ammonia plant is a multistage centrifugal machine driven by steam turbine using high-pressure superheated steam. It is one of the major consumers of steam in the plant.

To debottleneck the process air compressor in an existing plant, or in a new design ammonia plant operators have conventionally used a combination of the following measures: (a) Modification of existing compressor rotor and other essential internals of the compressor; (b) Addition of a parallel new compressor with a driver; (c) Increased suction chilling of process air using an expanded external refrigerant system.

Items (a) and (b) require significant capital and downtime with a long delivery schedule besides modifications and/or additional driver and energy requirement of high pressure steam for the turbine drive. The option (a) could typically achieve about 20% additional capacity. The potential of capacity increase with option (b) is much more and also may require additional compression power, and increased capital and plot space than option (a). In most cases, these options are frequently not economically justifiable based on the payback criteria.

Suction chilling of Item (c) has been practiced for long time and is also an expensive option for process air compressors since it may require an external mechanical refrigeration system with additional compression energy and plot space. However, this option may be somewhat less expensive than the first two options (a and b) but provides only a modest increase in capacity and is rarely justified economically-evident from the fact that only a handful of plants implemented suction chilling in ammonia plants. However, it remains a common feature for gas turbines in power plants.

What is needed is a new approach which provides a significant increase in process air compression capability without extensive capital investment requirements in expensive external refrigeration systems, no additional power requirements for the air compressors, and no expensive modifications to the process air compressor.

SUMMARY

This need is met by the recognition that there are refrigerant ammonia streams available in ammonia plants from existing ammonia compressors. A multistage chilling of the process air compressor as well as suction chilling is proposed by the integration of selected refrigerant ammonia streams from an existing ammonia compression train to provide air chilling and as a result a significant capacity increase in the air compression train and reduced power consumption. In some cases only a marginal increase in power may be required but well within the limit of the existing driver. Two modes are presented—a direct multistage chilling and an indirect multistage chilling.

The integration is accomplished by an ammonia plant system upgrade utilizing a direct single or multistage chilling system in the ammonia plant air compression train to increase process air flow to the secondary ammonia reformer of the ammonia plant including at least: a single integrated suction air chiller in the air compression train that chills incoming air by heat exchange with expanded high pressure ammonia from the ammonia compression train of the ammonia plant; additional two stage air chillers between each of the air compressors of the air compression train, each air chiller chilling incoming air by heat exchange with expanded high pressure ammonia from the ammonia compression train of the ammonia plant.

In a further upgrade the upgrade includes at least: a new steam preheater for heating the increased process air flow; wherein the preheated and increased production flow from the air compression train is separated into two or three streams which are further heated in: the existing dedicated process air preheat coils of the primary reformer; modified feed preheat convection coils of the primary reformer; and modified boiler feedwater convection coils; and wherein the combined heated two or three streams are fed to the secondary reformer.

In another embodiment the integration can be accomplished by an ammonia plant system upgrade utilizing an indirect multistage chilling system in the ammonia plant air compression train to increase process air flow to the secondary ammonia reformer of the ammonia plant including at least: a two stage suction air chiller in the air compression train that chills incoming air by heat exchange with chilled water from the ammonia compression train; additional two stage air chillers between each of the air compressors of the air compression train, each air chiller chilling incoming air by heat exchange with chilled water from the ammonia compression train; a staged water chiller that chills water for the air compression train by heat exchange with expanded high pressure ammonia from the ammonia compression train.

In a further upgrade of this indirect system the upgrade includes at least: a new steam preheater for heating the increased process air flow; wherein the preheated and increased production flow from the air compression train is separated into two or three streams which are further heated in: the existing dedicated process air preheat coils of the primary reformer; modified feed preheat convection coils of the primary reformer; and modified boiler feedwater convection coils; and wherein the combined heated two or three streams are fed to the secondary reformer.

In another embodiment of direct integrated air chilling with ammonia from various ammonia streams in an associated multistage ammonia compression train one new integrated chiller installed in the front end of the air compression train is cooled with expanded ammonia from one or more stages of the associated ammonia compression train, without the addition of any other integrated chillers in the process air compression train.

In another embodiment of direct integrated air chilling with ammonia from various ammonia streams in an associated multistage ammonia compression train one new integrated chiller installed in the front end of the air compression train is cooled with expanded ammonia from one stage of the associated ammonia compression train, without the addition of any other integrated chillers in the process air compression train.

In other embodiments of indirect integrated air chilling the integration can be accomplished by an ammonia plant system upgrade utilizing an indirect multistage chilling system in the ammonia plant air compression train to increase process air flow to the secondary ammonia reformer of the ammonia plant including at least: one or two stage integrated chillers in the air compression train that chills incoming air by heat exchange with chilled water from the ammonia compression train; with the air chiller chilling incoming air by heat exchange with chilled water from the ammonia compression train; and a staged water chiller that chills water for the air compression train by heat exchange with expanded liquid ammonia from the ammonia compression train.

BRIEF DESCRIPTION OF THE DRAWINGS

In FIGS. 1 through 10, like reference numerals designate the same components and structural features, unless otherwise indicated.

DETAILED DESCRIPTION

In the following detailed description some temperatures and pressures are presented to provide insight. These values can vary depending on the particular process air compression train and the relative size and capability of the equipment. These temperatures and pressures should not be construed as limitations in this application.

Figure 1:
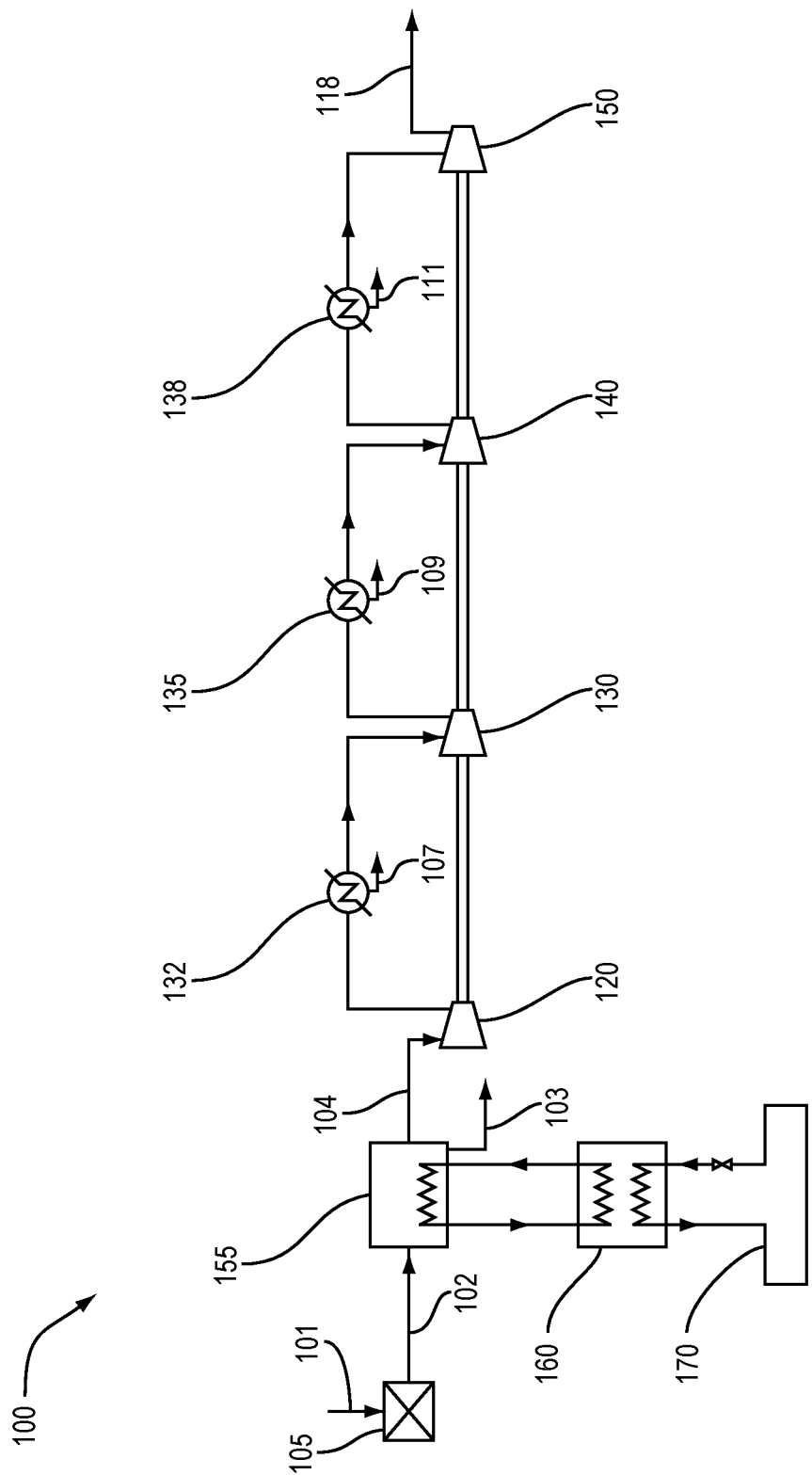
FIG. 1 is a schematic drawing of a prior art process air compression train in a typical ammonia plant.

Referring first to FIG. 1, a prior art process air compression train in an ammonia plant, is shown overall as numeral 100. Four compressor stages 120, 130, 140, and 150 are shown, with intercoolers 132, 135, and 138 used between compressors 120 and 130, compressors 130 and 140, and compressors 140 and 150, respectively. Inter-stage coolers 132, 135, and 138 use plant cooling water to partially remove the heat of compression and in the process remove some moisture 107, 109, and 111 as condensate. High pressure process air 118 is the output from the process air compression train.

On the suction side of compressor 120 the first compressor accepts filtered 102 and chilled 104 air from a suction air chiller 155 that both cools the filtered air and removes condensate 103. The filtered air is produced from a filter 105 drawing in atmospheric air 101. Suction chillers such as 155 are often not present in all prior art process air compression trains. Prior art suction air chillers such as 155 typically use chilled water supplied from a water chiller 160 that chills the water using a stand alone refrigeration package 170. Various refrigerants can be used in such packages, including the use of ammonia as the refrigerant.

As mentioned in the background section of this disclosure one option for increasing capacity is to significantly increase the capacity of the stand-alone refrigeration package. In practice this is an expensive option with a relatively modest improvement and it is not a part of the proposed embodiments of this disclosure.

Figure 2:
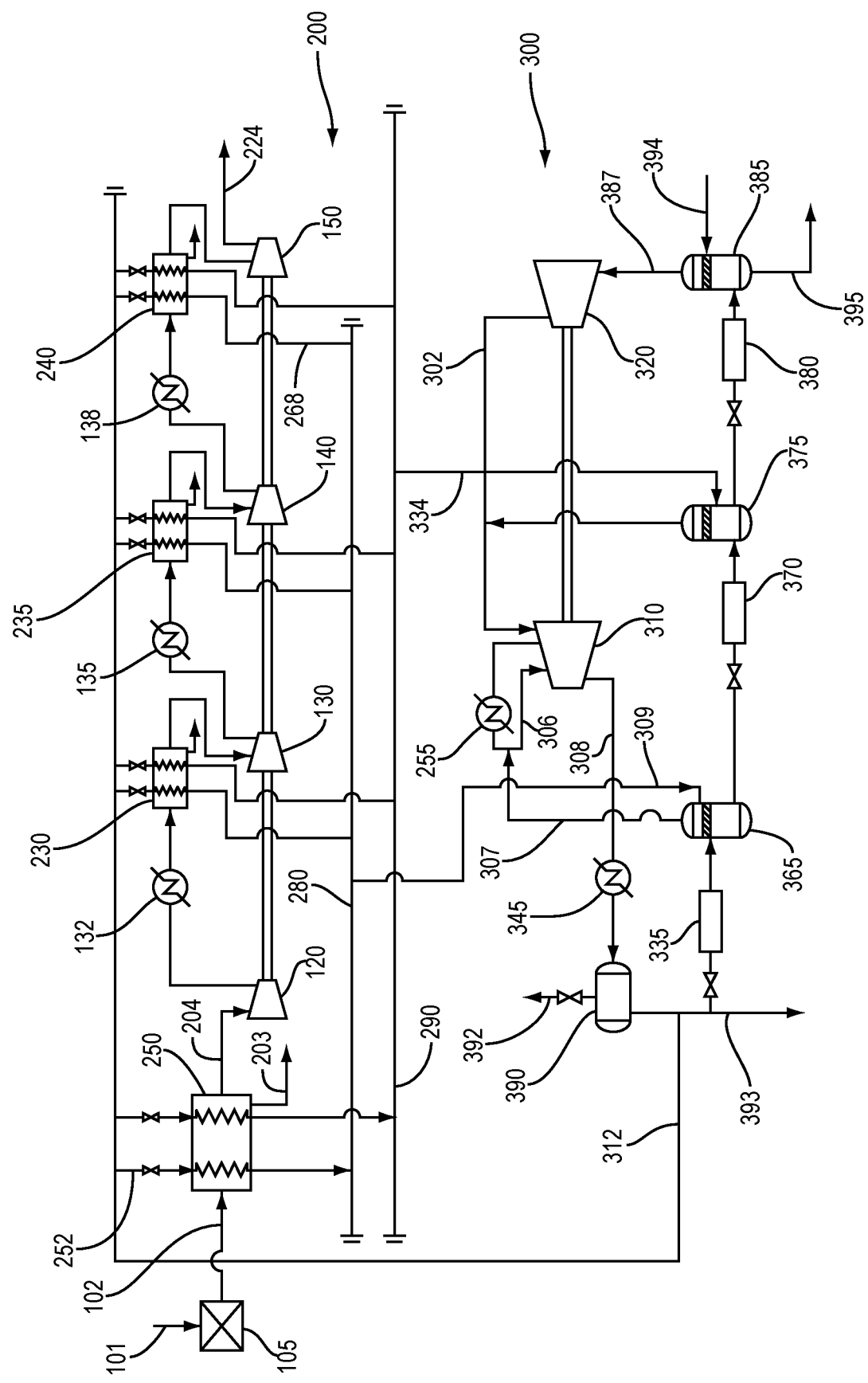
FIG. 2 is a schematic drawing of a direct integrated multistage air chilling embodiment of this disclosure.

FIG. 2 shows the ammonia plant upgrade using the direct integrated multistage embodiment of the disclosure. In this figure the numeral 200 represents the process air compression train and the numeral 300 an ammonia compression train. Generally, in an ammonia production plant, there is an ammonia compression train but it is not integrated with the air compression train to provide cooling. The overall FIG. 2 shows how the two are tied together, which is one of the embodiments of the present disclosure.

The air compression train, with its four compressor stages 120, 130, 140, and 150 are shown, with intercoolers 132, 135, and 138 used between compressors 120 and 130, compressors 130 and 140, and compressors 140 and 150, respectively. Inter-stage coolers 132, 135, and 138 again use plant cooling water to partially remove the heat of compression and in the process remove some moisture as condensate. Thus this aspect of the embodiment is not changed—that is to say—the existing compressors and inter-stage coolers are used. High pressure process air 224 exit compressor stage 150 is the output from the process air compression train in FIG. 2.

Added chillers 230, 235, and 240 are now in the process in each case following the intercoolers 132, 135, and 138 used between compressors. In addition a new suction air chiller 250 either replaces the previous suction air chiller 155 of FIG. 1 or is a new addition. Air chiller 250 accepts filtered air 102, removes condensate 203, and delivers chilled air 204 to compressor 120.

Numeral 300 exhibits generally an ammonia compression train in ammonia manufacture. This closed loop ammonia compression train involves three stages of compression in two casings, compressor casings 320 and 310. Compressor casing 310 has a lower pressure (LP) and a higher pressure (HP) section. Ammonia from the ammonia synthesis loop 394 enters into the low pressure flash drum 385. An ammonia vapor stream 387 is fed from the low pressure flash drum 385 to compressor 320 and compressor 320 compresses the vapor state to about 40 psig, shown as stream 302. At this stage the ammonia temperature is about 175° F. The compressed ammonia passes to second stage (high pressure case) ammonia compressor 310 where it is further compressed and inter-cooled by removing some of the ammonia and passing it through water pressurized ammonia cooler 255. The cooled ammonia in the vapor phase 306 is further compressed in the $3^{rd}$ stage of high pressure casing 310. The resulting higher pressure ammonia 308 passes through compressed ammonia cooler 345 to liquid ammonia buffer drum 390, where inert hydrocarbons 392 are removed and compressed ammonia 312 at about 235 psig and 100° F. is sent to the air compression train where it is used is to provide the additional chilling needed by the air compression train to boost the production capacity of the existing air compression train. Warm ammonia product 393 is drawn off at this point for other uses.

Still in FIG. 2, but turning now to the air compression train 200, the ammonia from the ammonia compression train is now used as a coolant in added chillers 230, 235, and 240, and in the new suction air chiller 250. These are all two stage chillers with the second stage being cooler than the first. In each of the added chillers and in the new suction air chiller the high pressure ammonia is expanded through valves to provide cooling and the resulting ammonia after passing through the coolers and chiller is collected in headers 280 and 290. Header 280 is at about 95 psig and header 290 is about 33 psig. The resulting enhanced cooling of the air stream progressing through the air compression train results in significant increase in air compression capacity with a minimum of new equipment investment.

The expanded ammonia from header 280 is at a higher pressure than that in header 290 and is returned (via 309) to high pressure flash drum 365 in the ammonia compression train 300 and is then flashed vapor recycled (via 307) back into the last compressor stage of compressor 310. The expanded ammonia from header 290 is at a lower pressure and is returned via stream 334 to medium pressure ammonia flash drum 375 from where some of the liquid ammonia is further expanded to provide cooling to various other plant users pressure. Expanded ammonia is fed, after cooling in heat exchanger 380, via stream 387 to the inlet of the LP stage of the ammonia compressor 320. The remaining ammonia vapors from ammonia flash drum 375 is combined with the compressed ammonia stream 302 exiting compressor 320. Additional cooling at the various pressure stages in the ammonia train is supplied by heat exchangers 335, 370, and 380, which are already existent in ammonia compression train 300.

This embodiment then represents an effective and affordable integration of an existing air compression train with an existing ammonia compression train to achieve a substantial increase in production with minimal capital investment.

Figure 3:
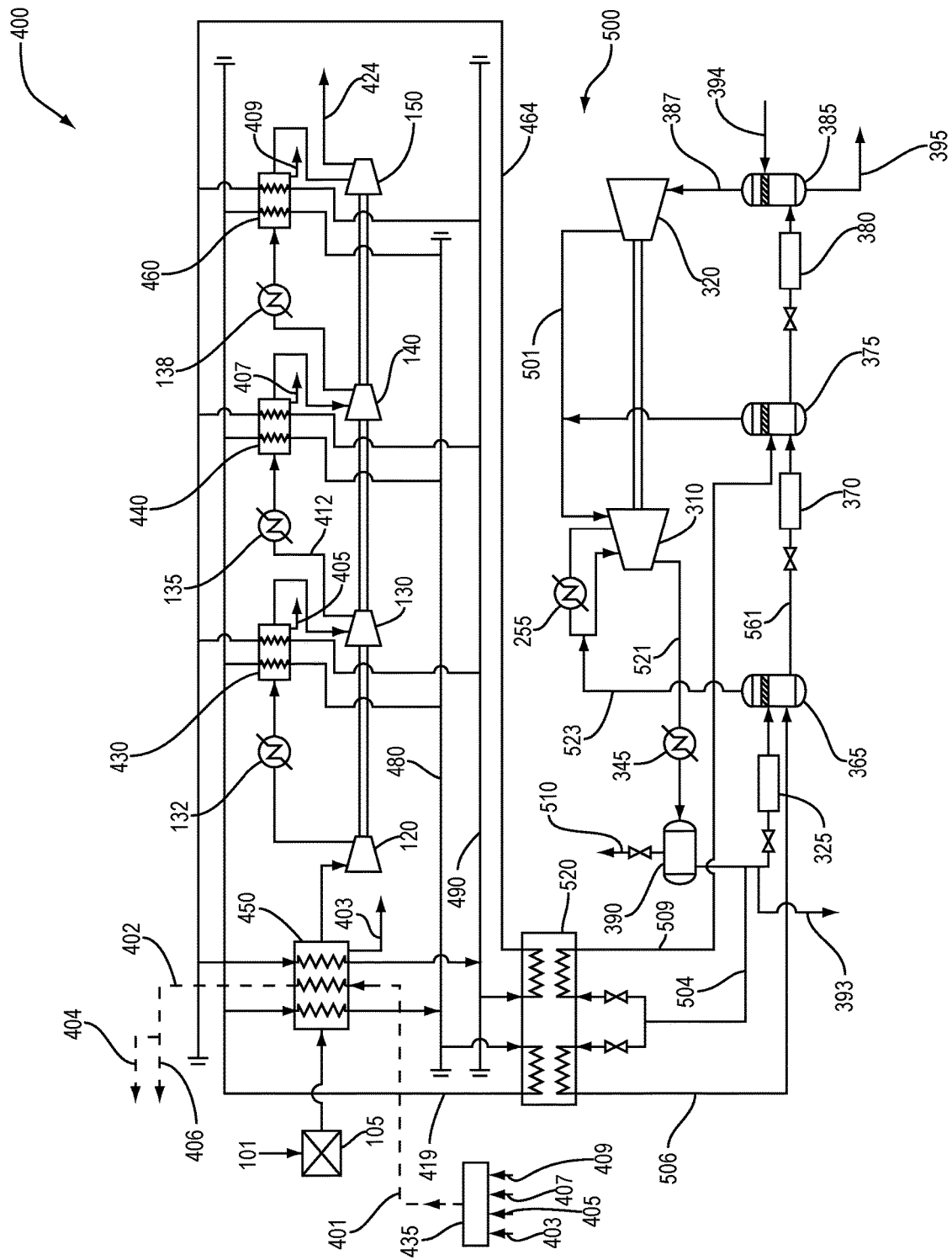
FIG. 3 is a schematic drawing of a indirect integrated multistage air chilling embodiment of this disclosure using ammonia and chilled water.

Turning now too FIG. 3 shown is an additional embodiment of the same inventive concept. The problem to be solved is again, how to increase air compression capacity with minimum capital expenditures and no additional power requirement. FIG. 3 shows an alternate embodiment that also uses compressed liquid ammonia from the ammonia compression train but in a different way. This embodiment is termed Indirect Multistage Air Chilling and the key difference is that the air compression train never has direct contact with ammonia streams but instead uses chill water obtained from direct heat exchange from the ammonia compression train through a new staged water chiller 520. In FIG. 3 the numeral 400 represents the air compression train and the numeral 500 an ammonia compression train. In an ammonia production plant there is always an ammonia compression train but it is not integrated with the air compression train to provide and cooling or chilling. The overall FIG. 3 shows how the two are tied together, which is one of the embodiments of the present disclosure.

The air compression train, with its four compressor stages 120, 130, 140, and 150 are shown, with intercoolers 132, 135, and 138 used between compressors 120 and 130, compressors 130 and 140, and compressors 140 and 150, respectively. Inter-stage coolers 132, 135, and 138 again use plant cooling water to partially remove the heat of compression and in the process remove some moisture as condensate. Thus this aspect of the embodiment has the same arrangement as that of FIG. 2 and the existing compressors and inter-stage coolers are used. High pressure process air 424 is the output from compressor stage 150 of the process air compression train in FIG. 3.

In this embodiment suction air chiller 450 replaces the previous suction air chiller 250 of FIG. 2. Modified air chillers 430, 440, and 460 replace chillers 230, 235, and 240 of FIG. 2.

In this embodiment all of the chillers are configured to exchange heat with chilled water rather than expanded ammonia. As a result the two headers 480,490 are now chilled water headers. With this embodiment ammonia never enters the air compression train 400.

Numeral 500 exhibits the ammonia compression train that already exists in ammonia manufacture. This closed loop ammonia compression train involves three stages of compression, with LP and HP compressor casings 320 and 310 respectively. Ammonia from the ammonia synthesis loop 394 enters into the low pressure flash drum 385. An ammonia stream 587 is fed from a low pressure flash drum 385 to first stage ammonia compressor 320 and the LP compressor casing 320 compresses ammonia vapor to about 40 psig, shown as stream 501. For understanding, at this stage the ammonia temperature is about 175° F. The compressed ammonia passes to the high pressure ammonia compressor 310 where it is further compressed and water cooled by removing some of the ammonia and passing it through pressurized ammonia intercooler 255. The resulting higher pressure ammonia 521, after being compressed in the third stage passes through a water cooled condenser 345 to liquid ammonia buffer drum 390, where inert hydrocarbons 510 are removed. A portion of the liquid compressed ammonia stream 504 at about 235 psig and 100° F. is sent to a new staged water chiller 520 where it is expanded to provide for cooling and used is to chill the return cooling water from headers 480, 490 that provide the additional cooling needed by the air compression train to boost the production capacity of the existing air compression train.

A key sub-system in the FIG. 3 embodiment is the use of the new staged water chiller 520 to provide cooling to a chilled water loop used in the air compression train. High pressure ammonia 504 is supplied to staged water chiller 520 where it is expanded to provide cooling in the staged water chiller. The two stages result in two chilled water streams 419 and 464 that feed into each side of staged chillers 430, 440, 460, and 450 to provide enhanced cooling to the intermediate stages as well as the suction chiller of air compression.

An important embodiment is the management of water via condensate collection. Condensate streams 403, 405, 407, and 409 are collected and fed to condensate collection 435. The combined condensate stream 401 is used to provide additional cooling/chilling in the suction chiller 450 or could be used in the suction chiller 250 of FIG. 2 as well. After passing through suction chiller 450 the warm water condensate stream 402 is routed via stream 406 back to warm water header 480 and any excess condensate 404 is disposed of.

The usage of collected moisture/water condensate eliminates the need for any external source of make-up water needed for the water chiller 520 besides providing an additional cooling of process air, thereby, marginally reducing the compression load on the ammonia compressor train 500.

The recycle ammonia from the two stages of staged water chiller 520 consists of two streams expanded to two different pressures and as a result two different temperatures. The higher pressure and higher temperature stream 506 returns to high pressure ammonia flash drum 365 from where some of the expanded ammonia is fed, via stream 561 after expanding and cooling in a set of heat exchangers 370, to medium pressure ammonia flash drum 375. The remaining ammonia vapor from high pressure ammonia flash drum 365 is fed, via stream 523 to the second stage of the high pressure stage of second stage ammonia compressor 310.

The second lower pressure and lower temperature recycle ammonia stream 509 feeds medium pressure ammonia flash drum 375. From the flash drum 375 the liquid ammonia is further expanded to provide cooling for various plant users through a set of heat exchangers 380, and flashed into low pressure flash drum 385 and is routed via stream 587 to the inlet of first stage ammonia compressor 320. The liquid ammonia from flash drum 385 is taken as product ammonia 395 and further routed to storage tanks via pumps as required. Ammonia vapors from ammonia flash drum 375 is combined with the compressed ammonia stream 501 exiting compressor 320.

In this embodiment there is no recycle ammonia from the air compression train returning to the ammonia compression train as in streams 309 and 334 in FIG. 2.

This embodiment then represents an alternate effective and affordable integration of an existing air compression train with an existing ammonia compression train to achieve a substantial increase in production with minimal capital investment.

It should also be noted that in most ammonia plant revamps—the ammonia converter in the synthesis loop is upgraded by increasing the ammonia conversion either by upgrading the converter internals and/or additional catalyst bed together with optimum operating parameters. This upgrade of the synthesis loop results in reduced load on the ammonia compressor to the extent of incremental ammonia conversion. The extra capacity on ammonia compressor is mainly utilized to increase the ammonia production to the economic limits of the front end section of ammonia plant. The remaining available capacity of ammonia compressor is being utilized by integrating it with the process air compressor as per this disclosure.

The advantages presented in the multistage integrated chilling of Process air compressor significantly increases the Process air capacity-which provides the following key benefits in an ammonia plant:

Reduced compression power for the same capacity or higher capacity for practically the same power.

Reduced fuel firing in the Primary reformer resulting in further energy savings.

Lower methane slip from the Secondary reformer—resulting in lower inerts and lower H2/N2 ratio in the Make Up Gas (MUG) to the Ammonia synthesis loop—which results in higher Ammonia production.

Figure 4:
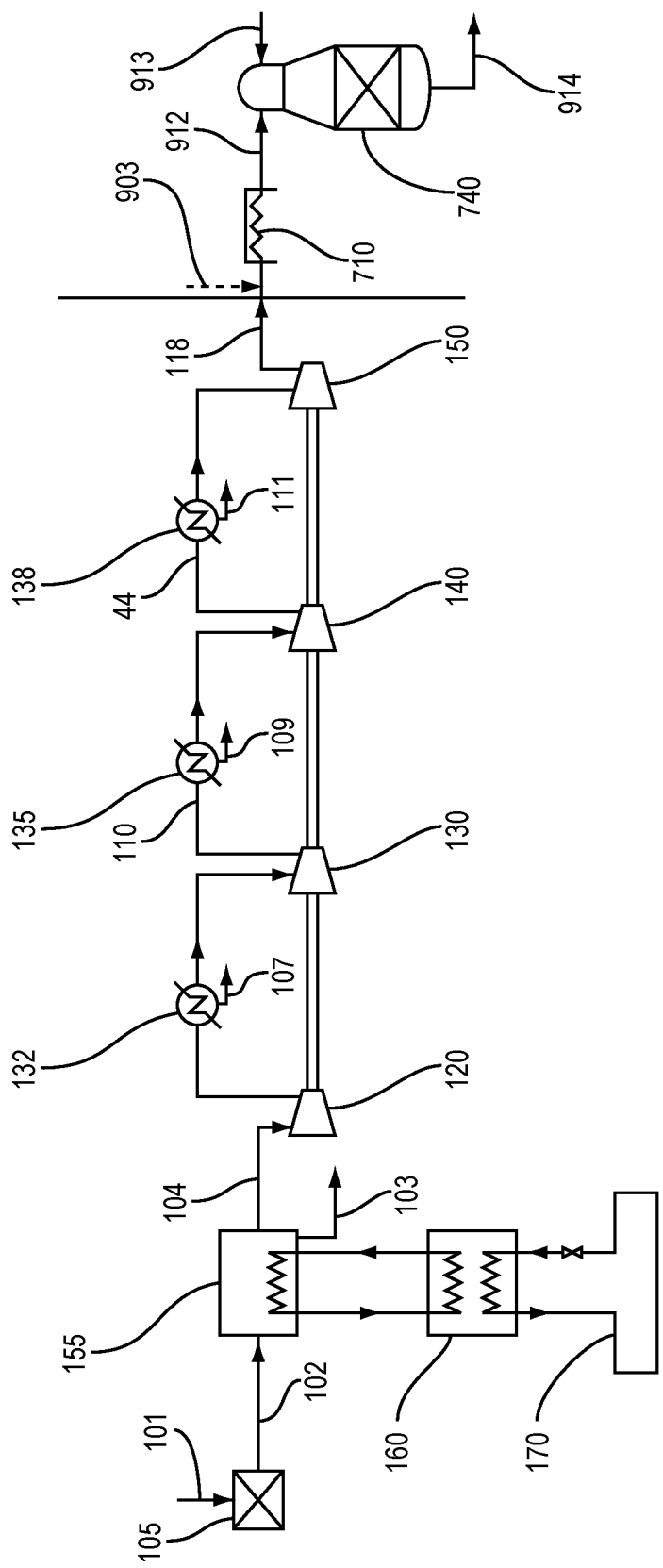
FIG. 4 is a schematic drawing of a prior art process air compression train showing its connection to the secondary reformer in the ammonia plant.

As shown in FIG. 4 (prior art) The compressed process air 118 in ammonia plants is further preheated through convection coils of the Primary Reformer (a small amount of medium pressure steam 903 is also added to it before preheating). The preheated process air mixture 912 is then injected into the Secondary reformer 740 to provide the necessary heat of reforming and also to adjust the required H2/N2 ratio for the ammonia synthesis reaction. The process air is conventionally preheated in the existing dedicated convection coils 710 of the Primary reformer by exchanging heat against the hot flue gases 917.

Figure 5:
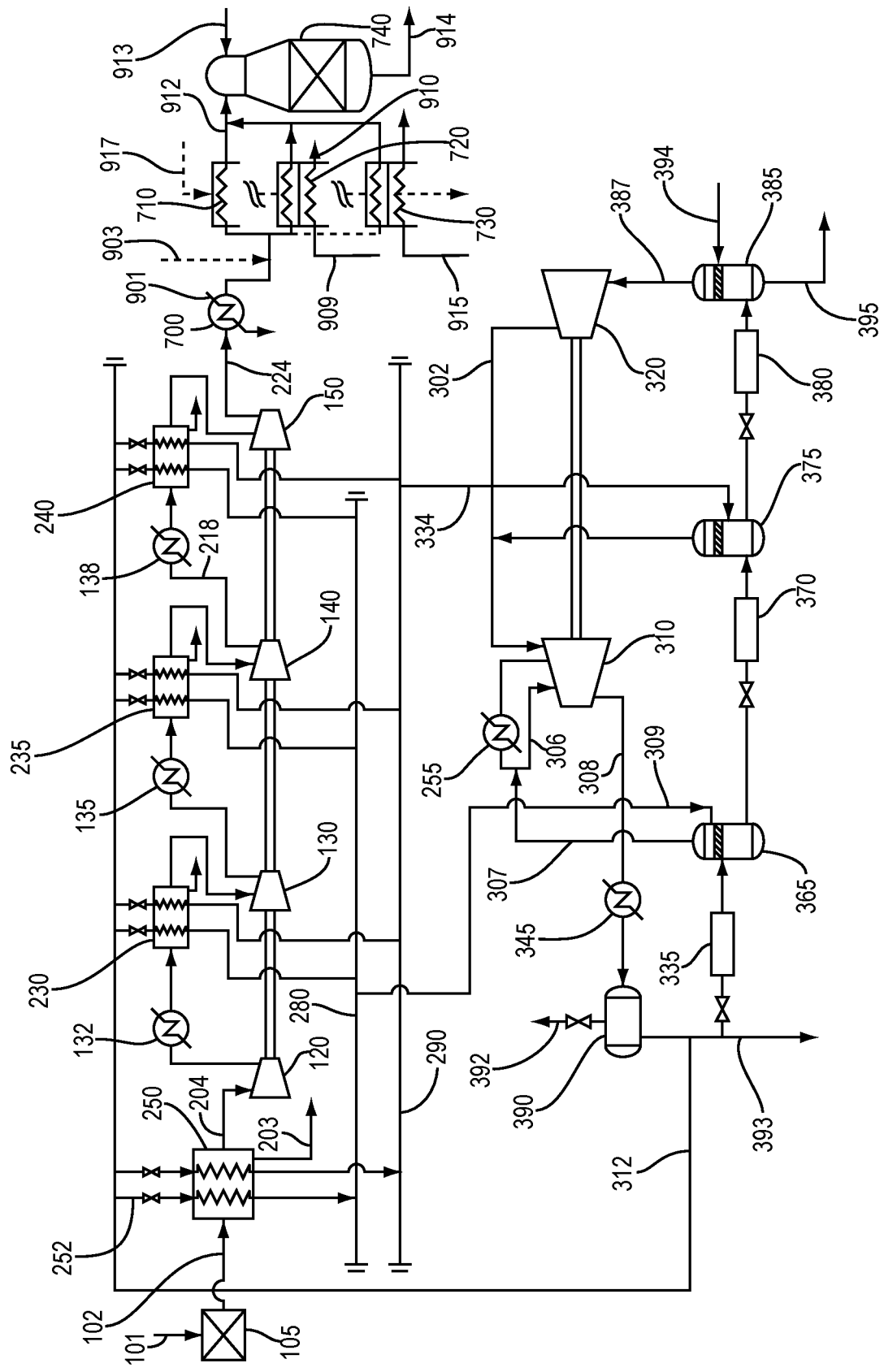
FIG. 5 is a schematic drawing of a direct integrated multistage air chilling embodiment of this disclosure with a disclosed modification of the heating arrangement for the secondary reformer.
Figure 6:
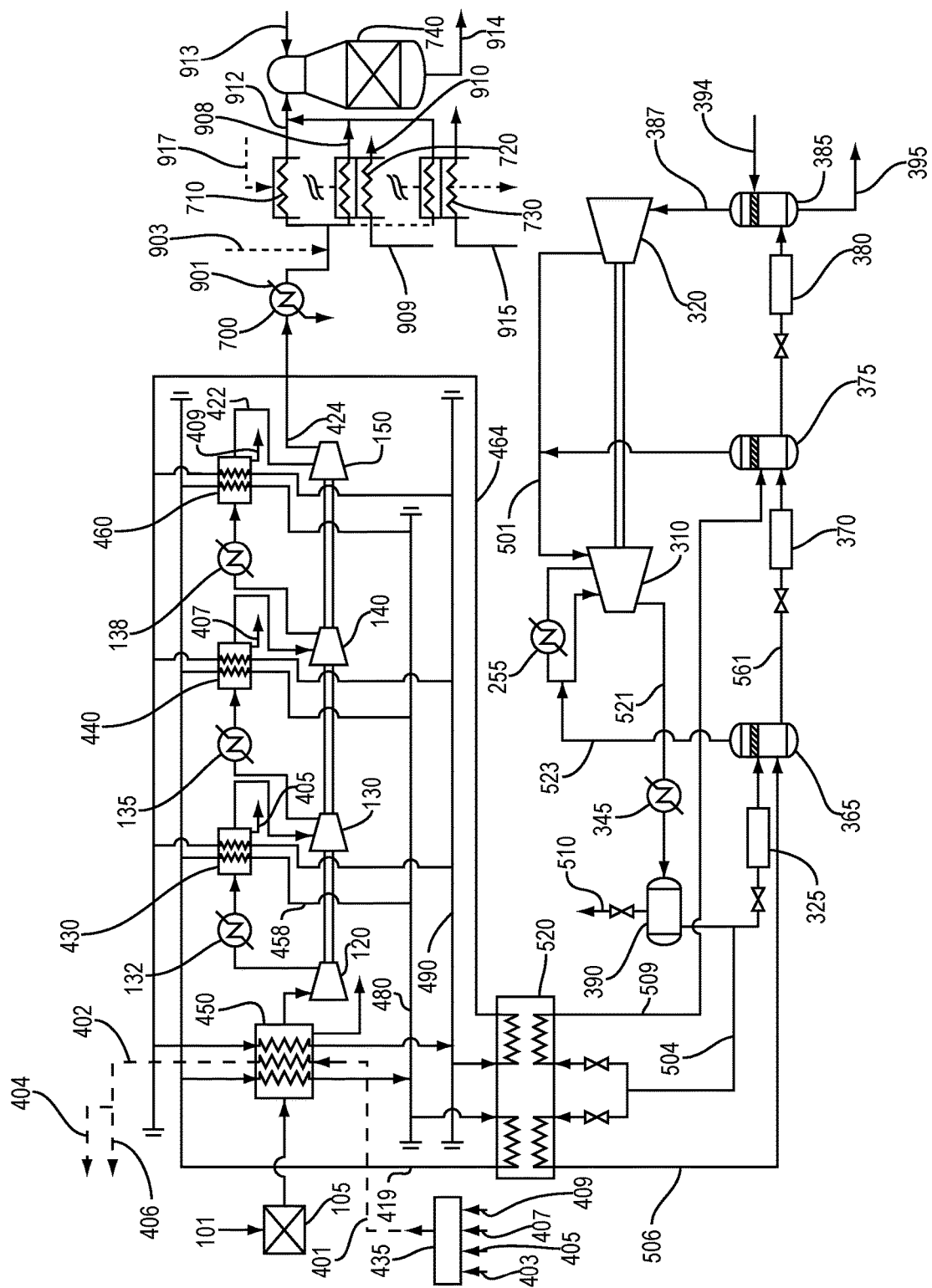
FIG. 6 is a schematic drawing of a direct integrated multistage air chilling embodiment of this disclosure with a disclosed modification of the heating arrangement for the secondary reformer.

The increase in the process air flow could require an additional heat transfer surface of convection preheat coils to maintain or increase the degree of process air preheat. Conventionally, the convection air preheat coils are modified with additional heat transfer surface depending on the available space in the existing convection section. This typical scheme 'as prior art' is shown in FIG. 4. In many ammonia plant reformers, the additional space to accommodate more heat transfer surface in the convection section is usually not available. The space constraint in the convection section limits the full benefits of increased air flow as the temperature of preheated air will reduce with higher flow of process air; resulting in a relatively lower conversion of methane in the Secondary reformer. To overcome this limitation, an additional embodiment scheme is proposed for either the direct chilling embodiment of FIG. 2 or the indirect chilling embodiment of FIG. 3. The resultant new embodiments are shown in FIG. 5 and FIG. 6.

These embodiments—based on multistage preheating and splitting of process air to significantly raise its temperature to the limits of maximum design limits include the following:

The first stage preheating of process air is done outside the existing convection section using a new high pressure steam heat exchanger 700.

Following the first stage preheating—the process air flow is split in two or more streams to be further preheated through the existing process air convection coil and through other identified coils in the convection section.

These embodiments come from the following analysis. The existing convection coils of various process services that have excess heat transfer area than required by the respective process service are first identified. In many existing ammonia plants, the feed preheat convection coil 720 and boiler feed water (BFW) 915 preheat convection coils 730 tend to be over-surfaced than required—especially in the revamp situations. This offers the opportunity to convert the excess heat transfer surface of those convection coils for additional air preheating by splitting the total process air flow as follows:

Compressed process air (224 in FIG. 5 or 424 in FIG. 6) is first preheated in a new steam air preheater 700—outside the convection section. This is done with pressure steam 901. The preheated air flow from (or before the steam exchanger) is then split in two or three parts to be further preheated in the convection section as follows; between 60% to 85% of the total air flow is routed to the existing dedicated process air preheat coils 710. And between 15% to 40% of air is routed to the modified feed preheat convection coil 720 for air preheating service and between 15% to 40% of air is routed to the modified boiler feed water (BFW) preheat convection coil 730 for air preheating service. A hydrocarbon feed inlet 909 and exit 910 passes through existing feed preheat convection coils 720. Boiler feed water 915 is also heated in the existing boiler feed water convection coils.

The combined flow preheated air 912 from these three sources is then fed, along with reformed gas 913 from the primary reformer into secondary reformer 740, resulting in 914 reformed gas from the secondary reformer.

Multistage external preheating of process air including the external preheating coupled with splitting the air flow for further preheating results in the following benefits:

Splitting the process air flow in two or three parts reduces the pressure drop in the process air path—thereby further reducing compression energy of process air compressor;

Multistage external preheating of process air coupled with the additional heat transfer surface area utilization in the convection section significantly raises the air preheat temperature—thereby reducing methane slip to the secondary reformer while reducing firing in the Primary reformer and also resulting in higher ammonia production with further energy savings;

Reduced air flow and heat duty in the existing convection air coils raises the temperature of flue gas leaving it. The higher flue gas temperature entering the next convection coil for steam superheating-raises the temperature of the superheated steam. Higher steam superheat temperature further reduces the steam demand for the steam drivers of various compressors in the ammonia plant.

Additional Background for the Discussion of FIGS. 7-10

Generally, any existing ammonia plant has one main Ammonia Refrigeration Compressor (ARC) and a Process Air Compressor (PAC)—both are centrifugal type machines and are multi-staged with one or two casings for ARC and always two casings for PAC. They both are inter-cooled by water-cooled heat exchangers. Some ammonia plants use a set of supplementary ARC (S-ARC) in addition to main ARC and they are usually screw type oil flooded machines.

The ARC train compresses the return ammonia vapor streams from different users at different pressure levels to high enough pressure in multi-stages to condense into ammonia liquid using a water-cooled heat exchanger (345). The liquid ammonia is collected in a liquid ammonia buffer drum (390). It is then distributed to different users to provide the necessary cooling or chilling depending on the level of cooling temperature required for different users in the ammonia plant. The ammonia from different ammonia users is returned in 100% vapor form at different pressures and temperatures. Lower temperature users return the ammonia vapors at a relatively lower pressure and warmer temperature users return the ammonia at a relatively higher pressure. According to the pressure level of each of the returning ammonia vapor streams, they are routed to the different stages of ARC. The stages in ARC can be classified as low pressure (LP), medium pressure (MP) & high pressure (HP) stages. The pressure levels for each of the stages in an ARC train can be slightly different in different ammonia plants depending on the ammonia process of the technology supplier. All the vapor streams are finally compressed to a higher than the HP pressure so that combined higher pressure ammonia vapor can be condensed with a water-cooled heat exchanger. In the schemes illustrated in FIGS. 7-10, the use of MP & HP pressures are illustrated.

The medium pressure ammonia vapor stream will be connected to the MP stage of the ARC and could require more compression ratio than a HP ammonia vapor stream and hence more power. To minimize the compression power of ARC, ammonia plant designers make a concerted effort to minimize the load of different MP users by suitably shifting to HP users. That is what brings the concept of multi-staging on ARC which essentially permits shifting some of the MP load towards HP which helps in reducing the power consumption of ARC.

Exemplary Example

Figure 7:
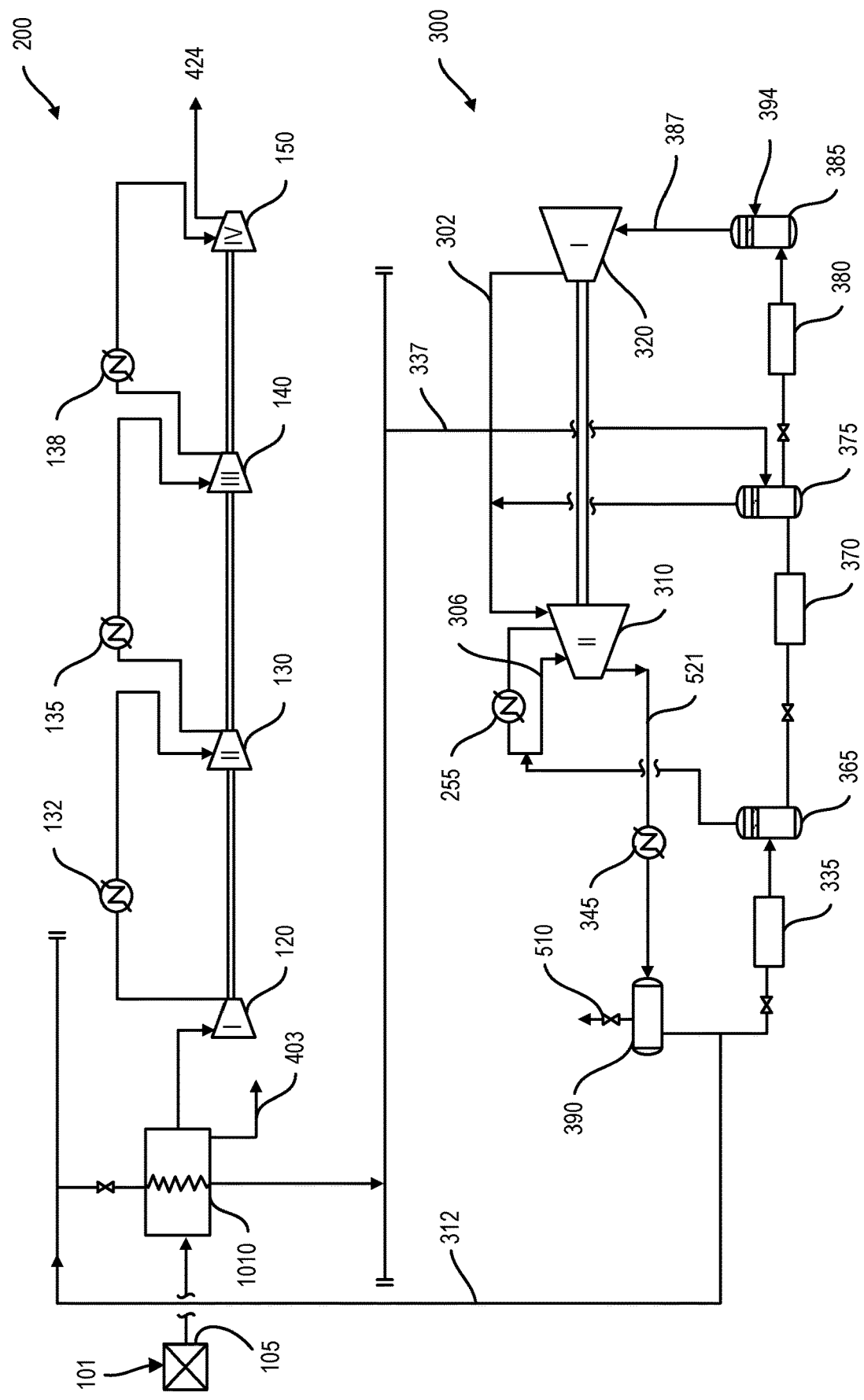
FIG. 7 is a schematic drawing of a direct integrated air chilling with ammonia in which a single integrated suction air chiller in the air compressor train is integrated with one stage of the ammonia compression train.

Although every ammonia plant may have slightly different conditions, a better understanding can be found by a fairly typical example. For a single suction chiller of the first stage of PAC (as shown in FIG. 7) from a typical summer ambient temp of 100 deg F. down to 40 deg using directly the liquid ammonia (typically available at 100 deg F. and ~215 psia). Two schemes to accomplish it are (a) using single staging of ammonia and (b) using two staging of ammonia.

A single-stage ammonia scheme will flash/expand the liquid ammonia to only one pressure level of about 65 psia that corresponds to the saturation temperature of ~34 deg F. All the return ammonia vapor generated in this scheme is at one pressure. So, 100% flow of the return vapor is suitably routed to the ARC's medium pressure stage. This will then be compressed all the way to 215 psia with a compression ratio of (215/65=3.3) consuming x power consumption in ARC.

Using a two-stage of ammonia scheme (to be shown in FIG. 8), the liquid ammonia will be split into two streams with approximately 70:30 flow ratio. The 30% of liquid ammonia will be flashed/expanded to about 125 psia with the saturation temp of about 68 deg F. This will cool the incoming air from 100 degree F. to about 75 deg F. The remaining 70% of the liquid stream will be flashed/expanded to about 65 psia with saturation temperature of 34 degree F. to cool the air from previous stage at 75 degree F. to about 40 degree F. or lower. This will have two return ammonia vapors—about 30% flow at about 125 psia and about 70% flow at about 65 psia. This might require a compression ratio of (215/125=1.72) for 30% of the stream and (215/65=3.3) for 70% of the stream with a net compression ratio of about 2.83 which is less than the compression ratio of about 3.3 required by the single-stage scheme. The two-stage scheme will consume much less power in ARC for this load but it will be relatively more expansive as it may require some additional hardware. The economics of using a single or multistage scheme with a single or multiple integrated chiller in PAC will thus depend much on the site specifics constraints and criteria.

FIG. 7 shows increasing the compressed process air flow in an ammonia plant compression train utilizing chilling provided by chilled and compressed liquid ammonia from the ammonia compression train. This embodiment uses a direct integrated multistage embodiment of the disclosure. In this figure the numeral 200 represents the process air compression train and the numeral 300 an ammonia compression train. Generally, in an ammonia production plant there is an ammonia compression train but it is not integrated with the air compression train to provide cooling of the process air. FIG. 7 shows how the two are tied together, which is one of the embodiments of the present disclosure.

The air compression train, with its four compressor stages 120, 130, 140, and 150 are shown, with intercoolers 132, 135, and 138 used between compressors 120 and 130, compressors 130 and 140, and compressors 140 and 150, respectively. Inter-stage coolers 132, 135, and 138 again use plant cooling water to partially remove the heat of compression and in the process remove some moisture as condensate. Thus this aspect of the embodiment is not changed— that is to say—the existing compressors and inter-stage coolers are used. Compressed process air 224 exit compressor stage 150 is the output from the process air compression train in FIG. 2 and FIG. 7.

Numeral 300 of FIG. 7 exhibits the ammonia compression train that already exists in ammonia manufacture. This closed loop ammonia compression system is essentially just like the ammonia compression train shown in greater detail in FIG. 2, involving two or three stages of compression in one or two casings, compressor casings 320 and 310. Compressor casing 320 has a lower pressure (LP) and 310 a higher pressure (HP) section. Ammonia produced from the ammonia synthesis loop 394 enters into the low pressure flash drum 385. An ammonia vapor stream 387 is fed from the low pressure flash drum 385 to compressor 320 and compressor 320 compresses the vapor state to about 40 psig, shown as stream 302. At this stage the ammonia temperature is about 175° F.

The compressed ammonia passes to second stage (high pressure case) ammonia compressor 310 where it is further compressed and inter-cooled by water cooled heat exchanger 255. The cooled ammonia in the vapor phase 306 is further compressed in the $3^{rd}$ stage of high pressure casing 310. The resulting higher pressure ammonia 308 is condensed in a water cooled heat exchanger 345 to liquid ammonia and is collected in a buffer drum 390, where a trace amount of inert vapors are also purged out. The liquid ammonia pressure in the buffer drum 390 is at about the saturation pressure corresponding to its temperature. The required amount of liquid ammonia 312 is sent to the air compression train 200 where it is suitably flashed to a lower pressure and provides the chilling duty needed by the suction air chiller 1010 in order to increase the capacity of the existing air compression train.

In the embodiment of FIG. 7 the use of a single new suction air chiller 1010 in the air compressor train 200 is integrated with the ammonia compression train 300 by returning all of the ammonia vapor from the outlet of the suction air chiller 1010 via stream 337 back to the medium pressure flash drum 375 of the ammonia compression train 300. Thus returning it to a medium pressure stage of ammonia compression. This can be termed as a single suction air chiller with single-staging of ammonia from the existing ammonia compressor.

Figure 8:
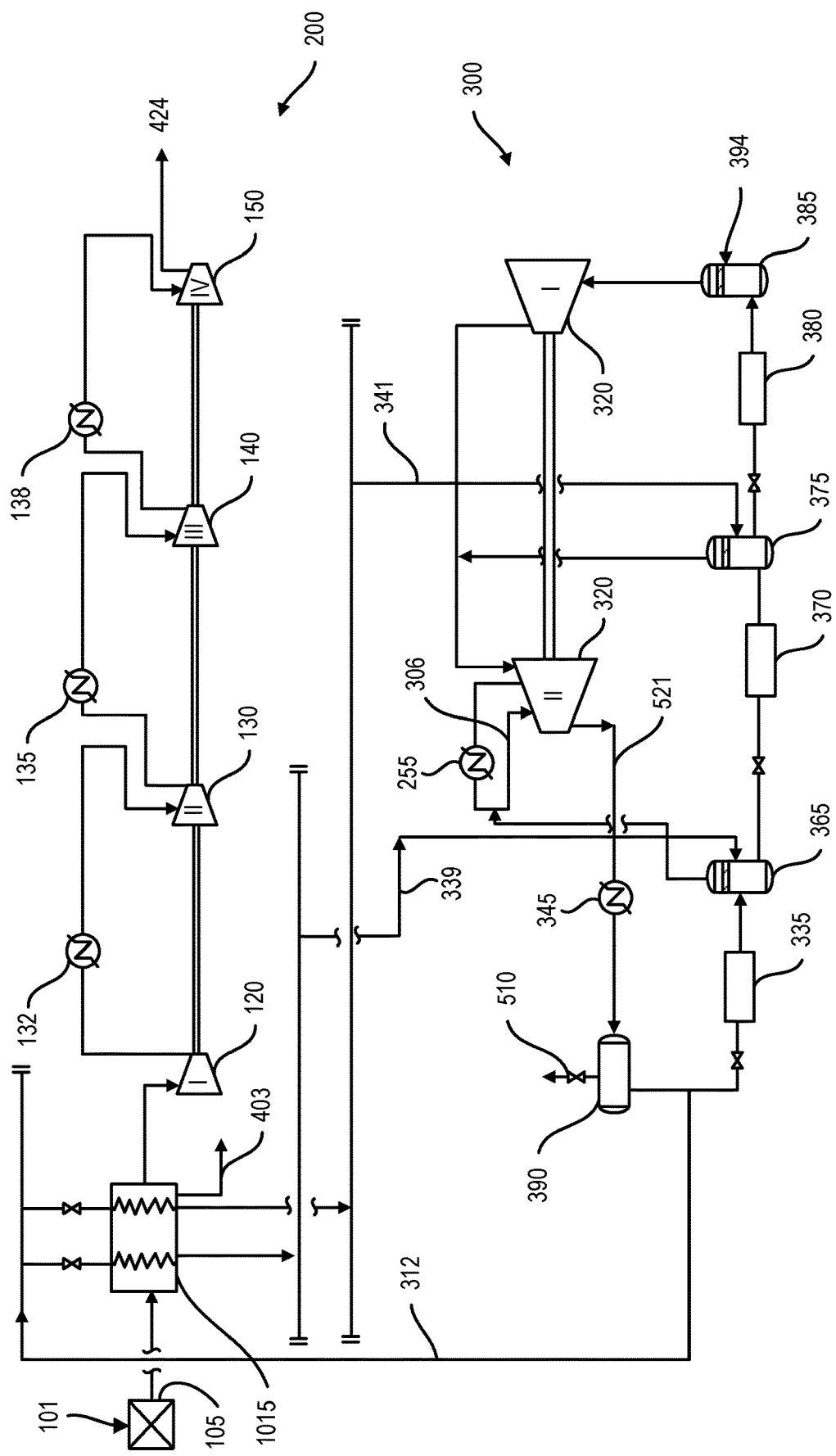
FIG. 8 is a schematic drawing of a direct integrated air chilling with ammonia in which a single integrated suction air chiller in the air compressor train is chilled with liquid ammonia and the resulting ammonia vapor is integrated with two or more different stages of the ammonia compression train.

In the embodiment of FIG. 8 is shown also as a direct chilling of the air in the air compression train 200 by suction air chiller 1015 chilled by splitting the liquid ammonia 312 from the ammonia compression train into two streams that are separately flashed at two different pressure levels in two separate sections in the suction air chiller 1015. This can be termed as single suction chiller with multi-staging directly with ammonia from the existing ammonia compressor train 300. In this embodiment the ammonia vapor is returned in two separate streams at two different pressures, from the outlet of the suction air chiller 1015, stream 339, returning ammonia vapor to high pressure flash drum 365, and separately in stream 341 to medium pressure flash drum 375 in the ammonia compression train 300.

Figure 9:
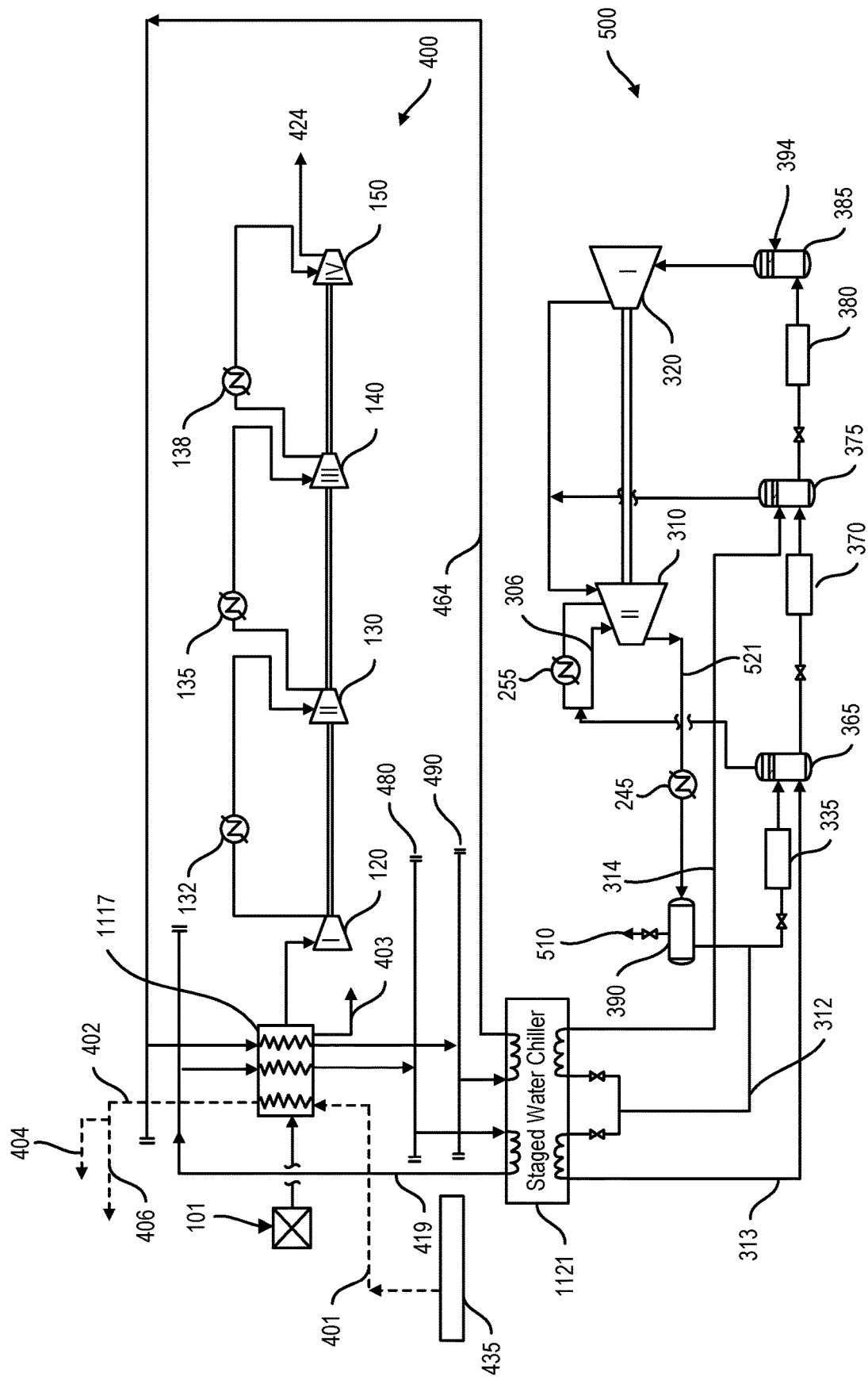
FIG. 9 is a schematic drawing of an indirect integrated air chilling in which the process air in the air compression train is chilled with chill water and no direct contact with ammonia. The chill water comes from heat exchange with liquid ammonia from the ammonia compression train and the resulting expanded ammonia vapor is integrated with two or more different stages of the ammonia compression train.

In the embodiment of FIG. 9 the air compression train 400 is no longer chilled directly by liquid ammonia but instead chilled indirectly by chilled water which is continuously chilled by ammonia from the ammonia compression train 500. This can be termed using a single suction chiller with indirect multi-staging of ammonia from the existing ammonia compressor. The main chilling of air occurs in a new suction air chiller 1117. Separately, a new staged water chiller 1121 provides heat exchange between ammonia stream 312 from the ammonia compression train and chilled water that is circulated through the separate sections or stages of suction air chiller 1117. The two stages result in two chilled water streams 419 and 464 that feed into each side of staged chiller 1117. Staged chiller 1117 never sees ammonia. The liquid ammonia stream 312 from ammonia compressor train is split in two parts and flashed at two different pressure levels in the new staged water chiller 1121. The return ammonia vapors from the outlet of the staged water chiller 1121 leave into two streams; stream 313 is fed back into the ammonia compression train into high pressure flash drum 365, and stream 314 is fed into medium pressure flash drum 375. Since ammonia in multi stages is first used to chill the water which is then used for chilling the air this can be termed as using indirect chilling using multi-staging of ammonia.

Figure 10:
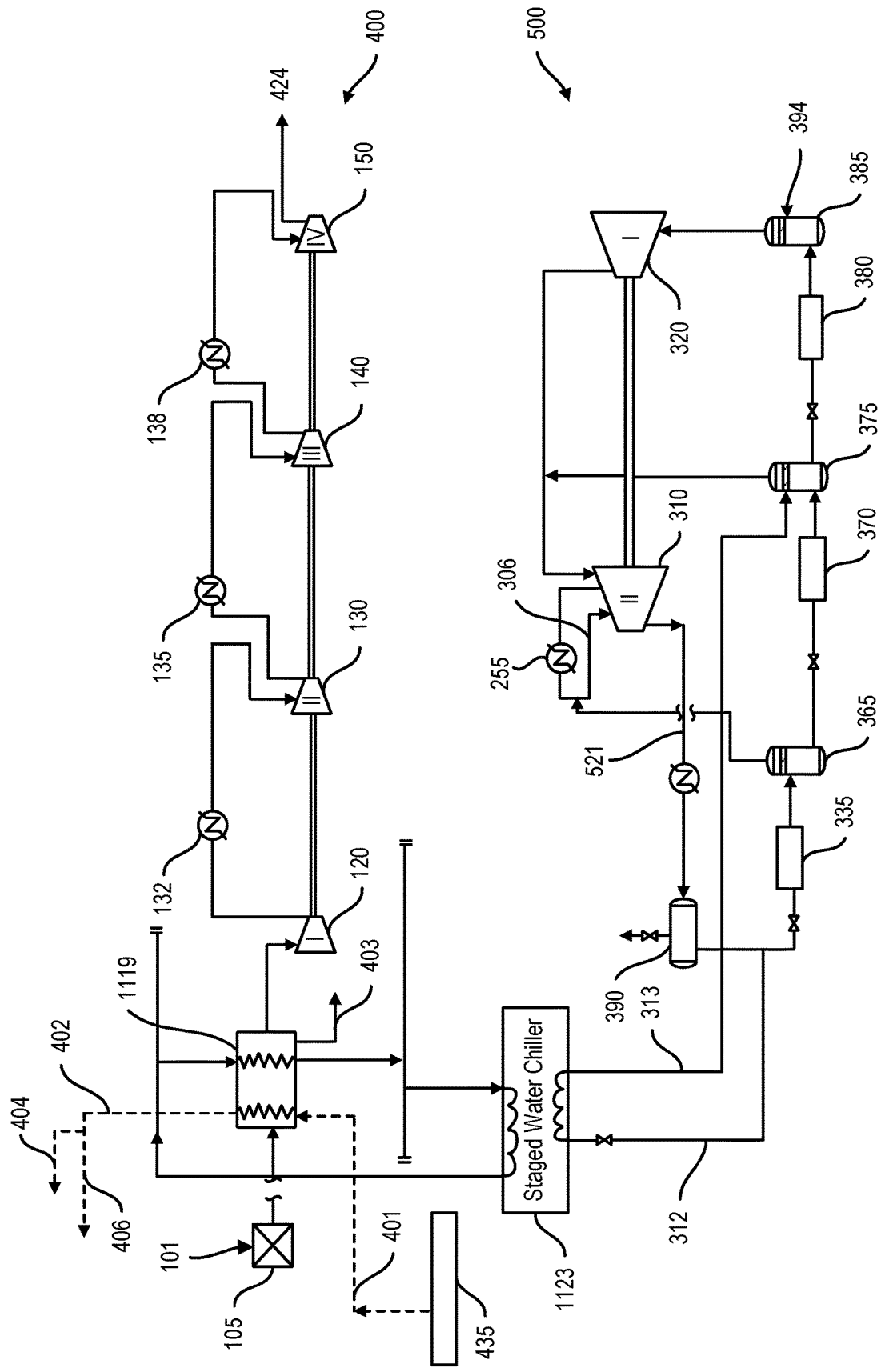
FIG. 10 is a schematic drawing of an indirect integrated air chilling in which the process air in the air compression train is chilled with chill water and no direct contact with ammonia. The chill water comes from heat exchange with liquid ammonia from the ammonia compression train and the resulting expanded ammonia vapor is integrated into one stage of the ammonia compression train.

In the embodiment of FIG. 10, the air compression train 400 is also no longer chilled directly by liquid ammonia from ammonia compression train 500 but instead chilled indirectly by chilled water. This embodiment can be termed using one suction chiller with indirect single-staging of ammonia from the existing ammonia compressor. Separately, a new staged water chiller 1123 provides heat exchange between ammonia stream 312 from the ammonia compression train and chilled water that is circulated through suction air chiller 1119. That chilled water is used to chill the incoming air in the suction air chiller 1119. All of the ammonia fed through staged water chiller 1123 is returned to the medium pressure flash drum 375 of the ammonia compression train 500. Hence indirect single staging of ammonia.

For the indirect chilling schemes of FIGS. 9 and 10 the water-cooling circuit is shown as two separate loops. It is also possible to configure these as a single water-cooling loops or multiple water-cooling loops depending on plant requirements and site specific economics.

The present disclosure has been described with reference to specific details of particular embodiments. It is not intended that such detail be regarded as limitations upon the scope of the disclosure except insofar as and to the extent that they are included in the accompanying claims.

The invention claimed is:

1. A method for improving the performance of an ammonia plant utilizing a direct integrated chilling system in an ammonia plant air compression train to increase process air flow to a secondary reformer of the ammonia plant, the method comprising:
   providing a single integrated suction air chiller in the ammonia plant air compression train for chilling incoming air by heat exchange with compressed liquid ammonia;
   supplying the compressed liquid ammonia from the ammonia plant ammonia compression train to the single integrated suction air chiller;
   expanding the compressed liquid ammonia to an expanded ammonia vapor in the single integrated suction air chiller to provide chilling of the air; and
   returning all of the expanded ammonia vapor to the ammonia plant ammonia compression train to be integrated for recompression and cooling back to liquid ammonia.

2. The method of claim 1, wherein providing the single integrated suction air chiller in the ammonia plant air compression train provides the single integrated suction air chiller in which all of the ammonia flows through and is expanded to the expanded ammonia vapor in only one section in the single integrated suction air chiller, and wherein returning all of the expanded ammonia vapor to the ammonia plant ammonia compression train returns all of the expanded ammonia vapor to a single medium pressure stage of the ammonia plant ammonia compression train.

3. The method of claim 1, wherein providing the single integrated suction air chiller in the ammonia plant air compression train provides the single integrated suction air chiller in which the entering liquid ammonia is separated and flows through two separate sections of the single integrated suction air chiller and is expanded to two different pressure levels of the expanded ammonia vapor, and wherein returning all of the expanded ammonia vapor to the ammonia plant ammonia compression train returns a higher pressure vapor to a higher pressure stage of the ammonia plant ammonia compression train and a lower pressure vapor to a lower pressure stage of the ammonia plant ammonia compression train utilizing multi stage compression.

4. The method of claim 1 further comprising the steps of:
   providing an added new steam preheater for heating an increased process air flow;
   splitting the preheated and increased process air flow from the ammonia plant air compression train into two or three streams;
   wherein each of the two or three streams is further heated in:
      available dedicated process air preheat convection coils in the ammonia plant;
      available excess heat transfer surface of feed preheat convection coils in the ammonia plant modified to accept a portion of the preheated and increased process air flow from the air compression train of the ammonia plant;
      modified available excess heat transfer surface of boiler feedwater convection coils modified to accept a portion of the preheated and increased process air flow from the air compression train of the ammonia plant;
      wherein the combined heated two or three streams are fed to the secondary reformer.

5. An ammonia plant utilizing a direct integrated chilling system in an ammonia plant air compression train of the ammonia plant to increase process air flow to a secondary reformer of the ammonia plant, comprising:
   a single integrated suction air chiller in the ammonia plant air compression train that chills incoming air by heat exchange with compressed liquid ammonia from an ammonia plant ammonia compression train of the ammonia plant and returns all of an expanded ammonia vapor to the ammonia plant ammonia compression train to be integrated for recompression and cooling back to liquid ammonia.

6. The ammonia plant of claim 5, wherein the single integrated suction air chiller is configured so that all of the ammonia fed to the single integrated suction air chiller from the ammonia plant ammonia compression train flows through and is expanded to the expanded ammonia vapor in only one section in the single integrated suction air chiller and then is integrated into the ammonia plant ammonia compression train when all of the returned expanded ammonia vapor is routed to a medium pressure stage of the ammonia plant ammonia compression train.

7. The ammonia plant of claim 5, wherein the single integrated suction air chiller is configured so that liquid ammonia is separated and flows through two separate sections of the single integrated suction air chiller and is expanded to two different pressure levels of expanded ammonia vapor and then integrated into the ammonia plant ammonia compression train with the higher pressure expanded ammonia vapor returned to a higher pressure stage of the ammonia plant ammonia compression train and the lower pressure expanded ammonia vapor returned to a lower pressure stage of the ammonia plant ammonia compression train.

8. The ammonia plant of claim 5, further comprising:
   an added new steam preheater for preheating an increased process air flow;
   wherein the preheated and increased production flow from the ammonia plant air compression train is separated into two or three streams which are further heated in:
      dedicated process air preheat convection coils in the ammonia plant;
      available excess heat transfer surface of the feed preheat convection coils in the ammonia plant modified to accommodate a portion of the preheated process air flow from the air compression train of the ammonia plant; and
      available excess heat transfer surface of boiler feedwater convection coils of the ammonia plant modified to accommodate a portion of the preheated process air flow from the air compression train of the ammonia plant;
   wherein the combined heated two or three streams are fed to the secondary reformer of the ammonia plant.

9. A method for improving the performance of an ammonia plant utilizing an indirect integrated chilling system in an ammonia plant air compression train to increase process air flow to a secondary reformer of the ammonia plant, the method comprising:
   providing a single integrated suction air chiller in the ammonia plant air compression train for chilling incoming air by heat exchange with chilled water;
   providing a staged water chiller for chilling water for the single integrated suction air chiller by heat exchange with compressed liquid ammonia from the ammonia plant ammonia compression train
   supplying the compressed liquid ammonia from the ammonia plant ammonia compression train to the staged water chiller;

expanding the compressed liquid ammonia to an expanded ammonia vapor in the single staged water chiller to provide chilling of the water;

returning all of the expanded ammonia vapor to the ammonia plant ammonia compression train to be integrated for recompression and cooling back to liquid ammonia.

10. The method of claim 9, wherein providing the single integrated suction air chiller in the ammonia plant air compression train provides the single integrated suction air chiller in which the chilled water flows through in only one section of the single integrated suction air chiller and returns to the staged water chiller for additional cooling, and wherein returning all of the expanded ammonia vapor to the ammonia plant ammonia compression train to be integrated for recompression and cooling back to liquid ammonia returns all of the expanded ammonia vapor to a single medium pressure stage of the ammonia plant ammonia compression train.

11. The method of claim 9, wherein providing the single integrated suction air chiller in the air compression train provides the single integrated suction air chiller in which the chilled water flows through two separate sections of the single integrated suction air chiller and returns to the staged water chiller for additional cooling, and wherein supplying the compressed liquid ammonia from the ammonia plant ammonia compression train to the staged water chiller supplies that compressed liquid to the separate sections of the staged water chiller and the liquid ammonia is expanded to two different pressure levels of expanded ammonia vapor, and wherein returning all of the expanded ammonia vapor to the ammonia plant ammonia compression train returns a higher pressure expanded ammonia vapor to a higher pressure stage of the ammonia plant ammonia compression train and a lower pressure expanded ammonia vapor to a lower pressure stage of the ammonia plant ammonia compression train, utilizing multi stage compression.

12. The method of claim 9, further comprising:
providing an added new steam preheater for heating an increased process air flow;
splitting the preheated and increased process air flow from the ammonia plant air compression train into two or three streams;
wherein each of the two or three streams are further heated in:
available dedicated process air preheat convection coils in the ammonia plant;
available excess heat transfer surface of feed preheat convection coils in the ammonia plant modified to accept a portion of the preheated and increased process air flow from the air compression train of the ammonia plant;
modified available excess heat transfer surface of boiler feedwater convection coils modified to accept a portion of the preheated and increased process air flow from the air compression train of the ammonia plant;
wherein the combined heated two or three streams are fed to the secondary reformer.

13. An ammonia plant utilizing an indirect multistage chilling system in an ammonia plant air compression train of the ammonia plant to increase process air flow to a secondary ammonia reformer of the ammonia plant, comprising:
a single integrated suction air chiller in the ammonia plant air compression train that chills incoming process air by heat exchange with chilled water from the ammonia plant ammonia compression train;
a staged water chiller that chills water for the ammonia plant air compression train by heat exchange with expanded compressed ammonia from the ammonia plant ammonia compression train and returns the expanded ammonia vapor to the ammonia plant ammonia compression train to be integrated for recompression and cooling back to liquid ammonia.

14. The ammonia plant of claim 13, wherein the single integrated suction air chiller is configured so that all of the chilled water passes through one section of the single integrated suction air chiller and returns to the staged water chiller for additional re-chilling and the staged water chiller is configured so that all of the compressed liquid ammonia fed to the staged water chiller is expanded into the expanded ammonia vapor in one section of the staged water chiller and then integrated into the ammonia plant ammonia compression train when all of the returned expanded ammonia vapor is routed to a single medium pressure stage of the ammonia plant ammonia compression train.

15. The ammonia plant of claim 13, wherein the single integrated suction air chiller is configured so that its chilled water is separated into two or more separate sections and returns to the staged water chiller for additional re-chilling, and the staged water chiller is configured so that the compressed liquid ammonia is fed into two separate sections of the staged water chiller and is expanded to two different pressure levels of expanded ammonia vapor and then integrated into the ammonia plant ammonia compression train with the higher pressure expanded ammonia vapor returned to a higher pressure stage of the ammonia plant ammonia compression train and the lower pressure expanded ammonia vapor returned to a lower pressure stage of the ammonia plant ammonia compression train.

16. The ammonia plant of claim 13, further comprising:
an added new steam preheater for preheating an increased process air flow;
wherein the preheated and increased production flow from the ammonia plant air compression train is separated into two or three streams which are further heated in:
dedicated process air preheat convection coils in the ammonia plant;
available excess heat transfer surface of the feed preheat convection coils in the ammonia plant modified to accommodate a portion of the preheated process air flow from the air compression train of the ammonia plant; and
available excess heat transfer surface of boiler feedwater convection coils of the ammonia plant modified to accommodate a portion of the preheated process air flow from the air compression train of the ammonia plant;
wherein the combined heated two or three streams are fed to the secondary reformer of the ammonia plant.

* * * * *